(12) United States Patent
Chen et al.

(10) Patent No.: US 11,372,511 B2
(45) Date of Patent: Jun. 28, 2022

(54) CONDUCTING THIN FILM AND PREPARATION METHOD THEREFOR, TOUCH PANEL AND DISPLAY DEVICE

(71) Applicant: SHENZHEN ROYOLE TECHNOLOGIES CO., LTD., Guangdong (CN)

(72) Inventors: Xin Chen, Guangdong (CN); Yao Zhang, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/145,680

(22) Filed: Jan. 11, 2021

(65) Prior Publication Data

US 2021/0132716 A1    May 6, 2021

Related U.S. Application Data

(63) Continuation of application No. PCT/CN2018/095938, filed on Jul. 17, 2018.

(51) Int. Cl.
*G06F 3/045* (2006.01)
*H01B 5/14* (2006.01)

(52) U.S. Cl.
CPC .... *G06F 3/045* (2013.01); *G06F 2203/04102* (2013.01); *G06F 2203/04103* (2013.01); *H01B 5/14* (2013.01)

(58) Field of Classification Search
CPC ........... G06F 3/045; G06F 2203/04102; G06F 2203/04103; H01B 5/14
See application file for complete search history.

(56) References Cited

U.S. PATENT DOCUMENTS

2003/0189202 A1* 10/2003 Li .................. B82Y 10/00
257/14
2017/0277324 A1* 9/2017 Dan ............... G06F 3/0446

FOREIGN PATENT DOCUMENTS

CN    104299681 A    1/2015
CN    104685577 A    6/2015
(Continued)

OTHER PUBLICATIONS

Machine translation of CN105989212 (Year: 2016).*
(Continued)

*Primary Examiner* — Patrick N Edouard
*Assistant Examiner* — Joseph P Fox
(74) *Attorney, Agent, or Firm* — Hauptman Ham, LLP

(57) ABSTRACT

A conducting thin film and preparation method therefor, a touch panel, and a display device are provided by the present disclosure. The conducting thin film includes a substrate, a conducting layer arranged on the substrate, a protecting layer arranged on the conducting layer, and an electricity conducting adhesive. The conducting layer includes a conducting net formed of conducting material. The protecting layer defines a plurality of openings for exposing the conducting material. The electricity conducting adhesive is formed on the protecting layer such that the electricity conducting adhesive passes through the plurality of openings in contact with the conducting material, and is filled in the plurality of openings. The protecting layer formed before the electricity conducting adhesive, thus reducing the problem of the conducting net breaking caused by the exposed conducting material being oxidized and vulmayized, and the thereby improving the conductivity of the conducting thin film.

20 Claims, 3 Drawing Sheets

(56) References Cited

FOREIGN PATENT DOCUMENTS

| | | | |
|---|---|---|---|
| CN | 105989912 A | 10/2016 | |
| CN | 107390965 A | 11/2017 | |
| EP | 1944722 A2 * | 7/2008 | ........... G06K 9/0002 |

OTHER PUBLICATIONS

Machine translation of CN104299681 (Year: 2015).*
Machine translation of CN10107390965 (Year: 2017).*
Machine translation of CN101260285 (Year: 2008).*
The International search report issued in corresponding international application No. PCT/CN2018/095938 dated Mar. 19, 2019.

* cited by examiner

CONDUCTING THIN FILM AND PREPARATION METHOD THEREFOR, TOUCH PANEL AND DISPLAY DEVICE

This application is a continuation of International Application No. PCT/CN2018/095938, filed on Jul. 17, 2018. The disclosures of the aforementioned applications are hereby incorporated by reference in their entireties.

TECHNICAL FIELD

The present disclosure relates to a technical field of touch, more particularly relates to a conducting thin film and preparation method therefor, a touch panel, and a display device.

BACKGROUND

With the development of touch technology, consumers have more and more diversified and personalized demands for touch methods and touch effects of display devices. The conductivity of conducting thin films will affect the touch performance of touch panels.

The existing conducting thin films are generally prepared by silver nanowires mixed with substrates. However, exposed silver nanowires are easily oxidized and vulmayized, thus breaking conducting nets, and thereby affecting the conducting property of the conducting thin films.

SUMMARY

The technical problem to be solved by the present disclosure is to provide a conducting thin film and preparation method therefor, a touch panel, and a display device, which have a good stability.

In order to achieve the above objectives, embodiments of the present disclosure provide the following technical solutions.

In a first aspect, an embodiment of the present disclosure provides a conducting thin film, including:

a substrate;

a conducting layer arranged on the substrate, therein the conducting layer comprises a conducting net formed of conducting material;

a protecting layer arranged on the conducting layer, therein the protecting layer defines a plurality of openings for exposing the conducting material; and an electricity conducting adhesive formed on the protecting layer such that the electricity conducting adhesive passes through the plurality of openings in contact with the conducting material, and is filled in the plurality of openings.

In a second aspect, an embodiment of the present disclosure provides a method for preparing the above conducting thin film, comprising:

providing a substrate;

arranging a conducting layer on the substrate, therein the conducting layer comprises a conducting net formed of conducting material;

forming a protecting layer on the conducting layer, therein the protecting layer defines a plurality of openings for exposing the conducting material; and forming an electricity conducting adhesive on the protecting layer such that the electricity conducting adhesive passes through the plurality of openings in contact with the conducting material, and is filled in the plurality of openings.

In a third aspect, an embodiment of the present disclosure provides a touch panel including the above conducting thin film.

In a fourth aspect, an embodiment of the present disclosure provides a display device including the above touch panel.

Compared with the related art, the conducting thin film provided by an embodiment of the present disclosure has the protecting layer formed before the electricity conducting adhesive, thus reducing the problem of the conducting net breaking caused by the exposed conducting material being oxidized and vulmayized. In addition, the electricity conducting adhesive is filled in the plurality of openings to be fully contacted with the conducting material, thus increasing a contacting area between the electricity conducting adhesive and the conducting material, reducing the contact resistance, and the thereby improving the conductivity of the conducting thin film.

BRIEF DESCRIPTION OF THE DRAWINGS

In order to more clearly illustrate the technical solution of the present disclosure or the related art, the accompanying drawings required for describing the embodiments or the related art will be briefly described below. Apparently, the accompanying drawings in the following description are merely the embodiments of the present disclosure, and other drawings may be obtained by those skilled in the art according to these accompanying drawings without paying any creative labor.

DETAILED DESCRIPTION

The technical solutions in the embodiments of the present disclosure are clearly and completely described below with reference to the accompanying drawings in the embodiments of the present disclosure.

It will be apprehended that, the terms used herein is for the purpose of describing particular embodiments only, and is not intended to limit the disclosure. As used herein, the singular forms "a" and "the" are intended to include the plural forms as well, unless the context clearly indicates otherwise. Furthermore, the terms "include" and/or "comprise" when used in this specification indicate the presence of stated features, integers, steps, elements, and/or components, but do not preclude the presence or addition of one or more other features, integers, presence, or addition of steps, elements, components, and/or groups thereof. Described later in the specification is a preferred embodiment for carrying out the present disclosure. However, the description is for the purpose illustrating the general principles of the present disclosure, and the description is not intended to limit the scope of the present disclosure. The scope of the present disclosure should be defined by the appended claims.

Figure 1:
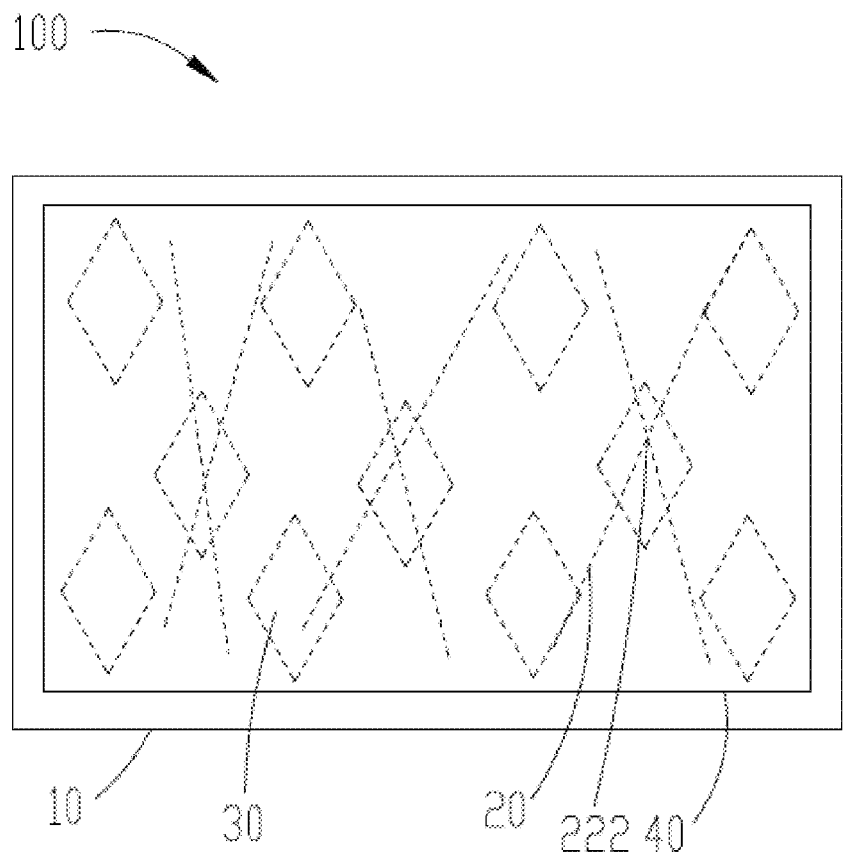
FIG. 1 is a schematic structural view of a conducting thin film provided by an embodiment of the present disclosure.
Figure 2:
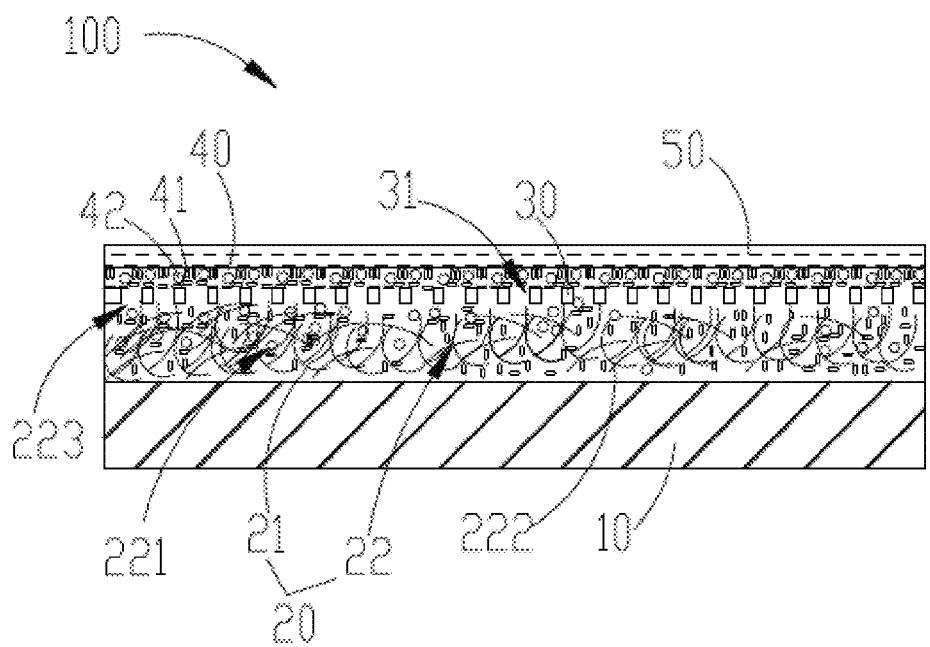
FIG. 2 is a cross-sectional view of the conducting thin film of FIG. 1.

As illustrated in FIG. 1 and FIG. 2, FIG. 1 and FIG. 2 are schematic views of a conducting thin film 100 provided by an embodiment of the present disclosure. The conducting thin film 100 includes a substrate 10, a conducting layer 20, a protecting layer 30, and an electricity conducting adhesive 40. The conducting layer 20 is arranged on the substrate 10. The conducting layer 20 includes a conducting net 22 formed of conducting material 21. The protecting layer 30 is arranged on the conducting layer 20, and the protecting layer 30 defines a plurality of openings 31 for exposing the conducting material 21. The electricity conducting adhesive 40 is formed on the protecting layer 30 such that the electricity conducting adhesive 40 passes through the plurality of openings 31 in contact with the conducting material 21, and is filled in the plurality of openings 31.

The substrate 10 is made of transparent material. The substrate 10 is, for example, but not be limited to one of a glass substrate, a polyimide (PI) substrate, a polyamide (PA) substrate, a polycarbonate (PC) substrate, a polyethersulfone (PES) substrate, a polyethylene terephthalate (PET) substrate, a polyethylene naphthalate (PEN) substrate, a polymethylmethacrylate (PMMA) substrate, and a cycloolefin copolymer (COC) substrate.

In the embodiment, the conducting layer 20 includes the conducting net 22 formed by stacking and lapping the conducting material 21. The conducting material 21 includes silver nanowires. The conducting net 22 includes a plurality of nodes 222 formed by lapping the conducting material 21. The plurality of nodes 222 are exposed to the plurality of openings 31 of the protecting layer 30 and are contacted with the electricity conducting adhesive 40.

The conducting net 22 has a plurality of hollows 221. The electricity conducting adhesive 40 is operable to be filled in the plurality of hollows 221, thus allowing the plurality of nodes 222 to be contacted with the electricity conducting adhesive 40, and thereby forming a flat conducting layer 20. In the embodiment, the shape and size of the plurality of hollows 221 may be the same or different. The plurality of hollows 221 are substantially in an irregular shape. The plurality of nodes 222 are distributed unevenly, that is, the plurality of nodes 222 are located on different planes. When the electricity conducting adhesive 40 is filled in the plurality of hollows 221 of the conducting net 22, the electricity conducting adhesive 40 can fill up the plurality of hollows 221 in the conducting net 22. The electricity conducting adhesive 40 has a plurality of conducting particles, which are contacted with the conducting net 22, thus achieving the conductivity. It will be apprehended that, since the conducting net 22 is formed by stacking and lapping the conducting material 21, the conducting net 22 includes an uneven surface 223, that is, the surface 223 is rough. When the electricity conducting adhesive 40 is filled in the plurality of hollows 221 of the conducting net 22, the surface 223 of the conducting net 22 becomes flat from unevenness, thus increasing the contact area between the conducting net 22 and the electricity conducting adhesive 40, and thereby reducing the contact resistance.

It will be apprehended that, the protecting layer 30 is arranged on the conducting layer 20 to cover the conducting material 21, thus reducing the problem of the conducting net 22 breaking caused by the exposed conducting material 21 being oxidized and vulmayized. For example, the protecting layer 30 is made of material, which is, but not limited to polyimide or polyethylene terephthalate. A thickness of the protecting layer 30 is substantially in a range from 4 μm to 6 μm, thus allowing the electricity conducting adhesive 40 to be penetrated more fully into the conducting net 22. The protecting layer 30 is a network structure.

Optionally, the plurality of nodes 222 of the conducting material 21 is exposed to the associated opening 31, thus allowing the electricity conducting adhesive 40 to be more fully in contact with the uneven nodes 222, and thereby forming a conducting path.

Optionally, the plurality of the openings 31 are arranged in an array. The shape and size of the plurality of openings 31 are the same to allow the electricity conducting adhesive 40 to be penetrated evenly into the conducting net 22 of the conducting layer 20. A diameter of each of the plurality of the openings 31 of the protecting layer 30 is substantially in a range from 50 nm to 100 μm, thus realizing the coverage of the conducting material 21 of the conducting layer 20, and thereby allowing the electricity conducting adhesive 40 to be filled more fully in the conducting net 22. The shape of the plurality of the openings 31 is, for example, but not limited to a rectangle, a diamond, a triangle, a circle, or an ellipse. Preferably, the plurality of the openings 31 is a centrally symmetric structure, thus allowing the electricity conducting adhesive 40 to be filled more evenly in the conducting net 22.

In the embodiment, the electricity conducting adhesive 40 includes a plurality of micron-sized particles and a plurality of nano-sized particles, and when the electricity conducting adhesive 40 is melted, a size of the plurality of nano-sized particles maintain in nano-scale, and the plurality of micron-sized particles are not melted together with the plurality of nano-sized particles. The plurality of micron-sized particles and the plurality of nano-sized particles are different electricity conducting material. Specifically, the electricity conducting adhesive 40 includes a plurality of nano-scale electricity conducting particles 41 and a plurality of micron-scale electricity conducting particles 42. The plurality of nano-scale electricity conducting particles 41 are, for example, but not be limited to one or a combination of carbon nanotubes, carbon rods, and graphene particles. The plurality of micron-scale electricity conducting particles 42 are, for example, but not be limited to silver powders. Content of the plurality of nano-sized electricity conducting particles 41 is in a range from 1 wt % to 20 wt % of total weight of the electricity conducting adhesive 40. A particle size of each of the plurality of nano-sized electricity conducting particles 41 is smaller than a diameter of each of the plurality of the openings 31 of the protecting layer 30. Such that the plurality of nano-sized electricity conducting particles 41 and the plurality of micron-scale electricity conducting particles 42 can be penetrated into the conducting net 22 of the conducting layer 20 by the plurality of openings 31 of the protecting layer 30, and can be interacted with the conducting net 22 to form the conducting path.

It will be apprehended that, in order to solve the problem of abnormal bonding impedance caused by a small contact area between the plurality of micron-sized electricity conducting particles 42 in the electricity conducting adhesive 40 and the conducting material 21, the plurality of nano-sized electricity conducting particles 41 have different nano-scale particles, thus fully and effectively filling a gap between the micron-sized electricity conducting particles 42 and the conducting material 21, increasing contact rates between the plurality of nano-sized electricity conducting particles 41 and the conducting material 21, and between the plurality of micron-sized electricity conducting particles 42 and the conducting material 21, decreasing the bonding impedance, and thereby improving the thermal conductivity and electrical conductivity of the conducting thin film 100. The plurality of micron-sized electricity conducting particles 42 are micron-sized silver powders. A particle size of each of the plurality of micron-sized electricity conducting particles 42 is in a range from 10 µm to 200 µm.

In the embodiment, the plurality of nano-sized electricity conducting particles 41 in the an electricity conducting adhesive 40 are not melted together with the plurality of micron-sized electricity conducting particles 42 in the an electricity conducting adhesive 40, thus effectively filling the gap between the plurality of micron-sized electricity conducting particles 42 and the conducting material 21, increasing contact rates between the plurality of nano-sized electricity conducting particles 41 and the conducting material 21, and between the plurality of micron-sized electricity conducting particles 42 and the conducting material 21, and thereby decreasing the bonding impedance. Particle sizes of the plurality of nano-sized electricity conducting particles 41 are in a range from 10 nm to 100 nm.

It will be apprehended that, the electricity conducting adhesive 40 further includes an adhesive and a curing agent. The adhesive and the curing agent use common material used in the preparation of electricity conducting adhesive in the related art. For example, the adhesive is, but not be limited to epoxy resin or modified resin.

Furthermore, the conducting thin film 100 further includes an insulating layer 50. The insulating layer 50 is formed on the electricity conducting adhesive 40, and covers the electricity conducting adhesive 40. The insulating layer 50 is made of transparent material to allow the whole conducting thin film 100 to be transparent and to be applied to transparent electronic products or transparent parts of electronic products. The insulating layer 50 is operable to protect the electricity conducting adhesive 40, thus preventing the generation of electrostatic discharge effects.

The conducting thin film provided by an embodiment of the present disclosure has the protecting layer formed before the electricity conducting adhesive, thus reducing the problem of the conducting net breaking caused by the exposed conducting material being oxidized and vulmayized. In addition, the electricity conducting adhesive with the two kinds of conducting particles having different sizes is filled in the plurality of openings to be fully contacted with the conducting material, thus increasing a contacting area between the electricity conducting adhesive and the conducting material, reducing the contact resistance, and the thereby improving the conductivity of the conducting thin film.

Figure 3:
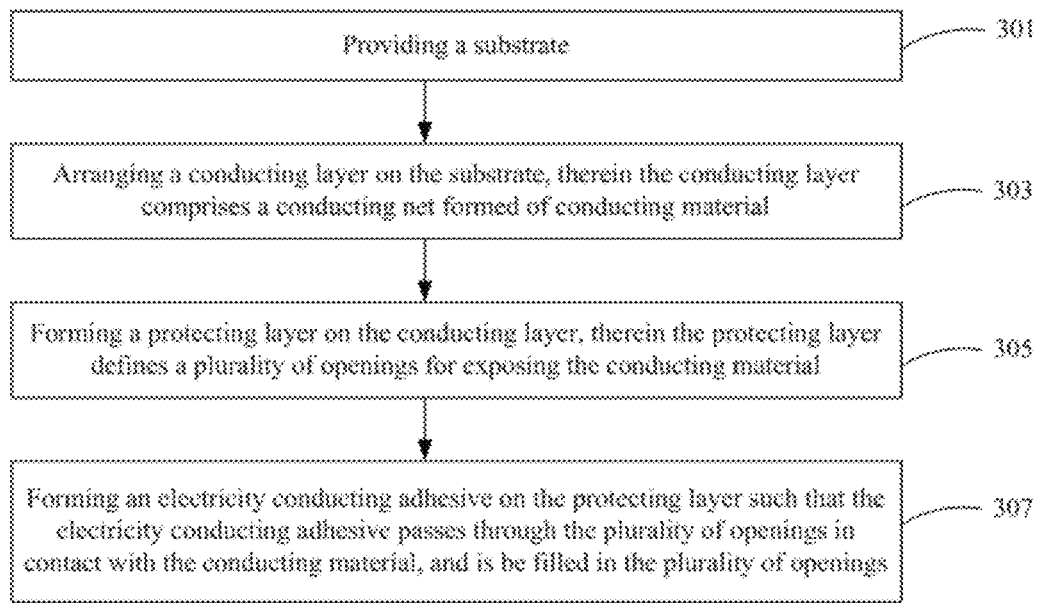
FIG. 3 is a flowchart of a method for preparing the conducting thin film of FIG. 1.

As illustrated in FIG. 2 and FIG. 3, FIG. 3 is a flowchart of a method for preparing a conducting thin film provided by an embodiment of the present disclosure. A method for preparing the above conducting thin film 100 includes the following operations.

At block S301, a substrate is provided.

At block S303, a conducting layer is arranged on the substrate. Therein the conducting layer comprises a conducting net formed of conducting material.

At block S305, a protecting layer is formed on the conducting layer. Therein the protecting layer defines a plurality of openings for exposing the conducting material.

At block S307, an electricity conducting adhesive is formed on the protecting layer such that the electricity conducting adhesive passes through the plurality of openings in contact with the conducting material, and is filled in the plurality of openings.

Furthermore, after performing the operation that the electricity conducting adhesive is formed on the protecting layer, the method further includes: curing the electricity conducting adhesive at a preset temperature for a preset time period.

In the embodiment, the preset time period is in a range from 0.5 hour to 2 hours, and the preset temperature is in a range from 80° C. to 150° C. The plurality of nano-sized electricity conducting particles 41 use carbon nanorods. It will be apprehended that, since the plurality of nano-sized electricity conducting particles 41 are stable at the curing temperature, after the electricity conducting adhesive 40 is cured, the carbon nanorods still maintain the nano-scale and are not melted together with the plurality of micron-sized electricity conducting particles 42, thus effectively filling the gaps between the plurality of micron-sized electricity conducting particles 42 and the plurality of nodes 222 formed by stacking and lapping the conducting material 21, increasing the contact rate of the conducting thin film 100, and thereby reducing the contact resistance.

In the embodiment, the electricity conducting adhesive 40 is provided after forming the conducting net 22, such that the surface 223 of the conducting net 22 and the plurality of openings 31 of the protecting layer 30 can be effectively filled by the electricity conducting adhesive 40.

Furthermore, after performing the operation of curing the electricity conducting adhesive at the preset temperature for the preset time period, the method further includes: forming an insulating layer 50 on the electricity conducting adhesive 40. The insulating layer 50 is made of transparent material to allow the whole conducting thin film 100 to be transparent and to be applied to transparent electronic products or transparent parts of electronic products. The insulating layer 50 is operable to protect the electricity conducting adhesive 40, thus preventing the generation of electrostatic discharge effects.

It will be apprehended that, the shape, structure and material components of the substrate 10, the conducting layer 20, the protecting layer 30, the electricity conducting adhesive 40, and the insulating layer 50 can refer to the description of each element of the conducting thin film 100 described in the above embodiment, which will not be described in further details.

Figure 4:
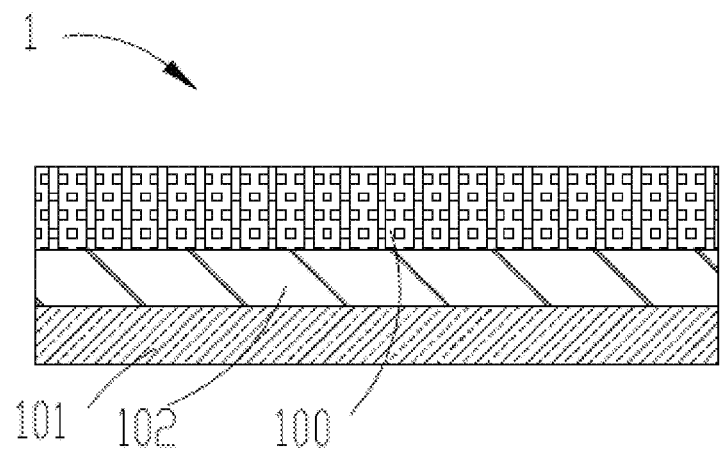
FIG. 4 is a schematic structural view of a touch panel provided by an embodiment of the present disclosure.

As illustrated in FIG. 4, an embodiment of the present disclosure provides a touch panel 1. The touch panel 1 includes the above conducting thin film 100, an adhesive layer 102, and a cover 101. The conducting thin film 100 can be patterned to form a touch electrode.

In the embodiment, the touch panel 1 is, for example, but not limited to a liquid crystal display (LCD) panel, a quantum dot light emitting diodes (QLED) panel, an E-paper Display (EPD), a touch screen, a flexible solar panel, a radio frequency identification (RFID), and other products or components with display functions.

Figure 5:
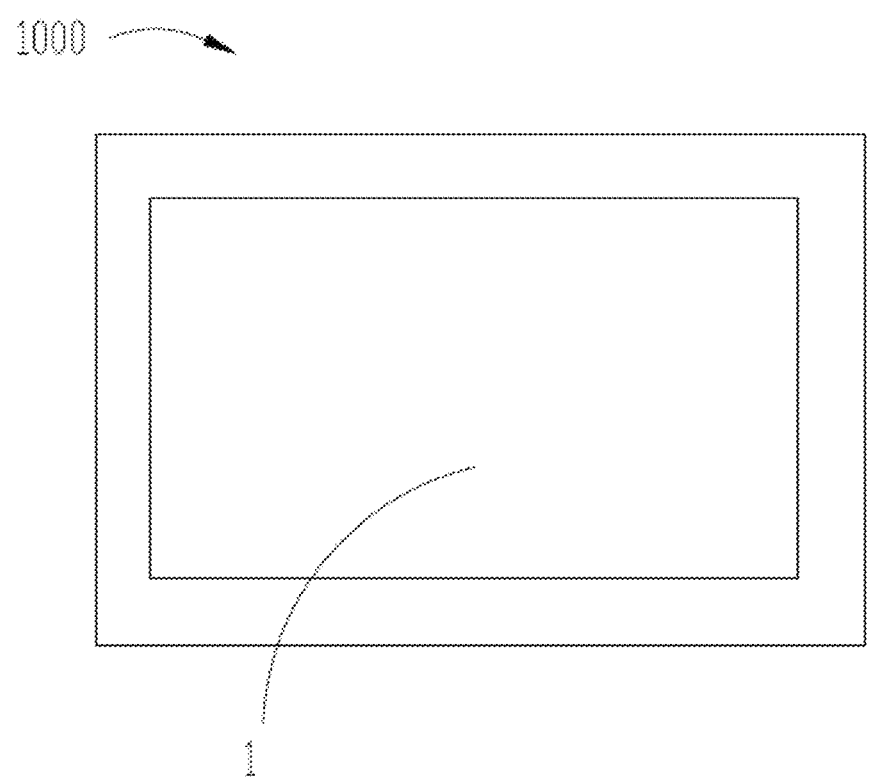
FIG. 5 is a plan view of a display device provided by an embodiment of the present disclosure.

As illustrated in FIG. 5, FIG. 5 is a plan view of a display device 1000 provided by an embodiment of the present disclosure. The display device 1000 includes the above touch panel 1.

The display device 1000 may be a flexible display device or an inflexible display device. The flexible display device is, for example, but not limited to a LCD, an QLED, a mobile phone, a tablet computer, a VR head-mounted display, a car display, or any product or component with display function.

The above embodiments are not intended to limit the protection scope of the technical solution. Any modifications, equivalent substitutions and improvements and so on made within the spirit and principle of the present disclosure should fall within the scope of protection of the present disclosure.

What is claimed is:

1. A conducting thin film, comprising:
a substrate;
a conducting layer arranged on the substrate, wherein the conducting layer comprises a conducting net formed of conducting material;
a protecting layer arranged on the conducting layer, wherein the protecting layer defines a plurality of openings for exposing the conducting material; and
an electricity conducting adhesive formed on the protecting layer such that the electricity conducting adhesive passes through the plurality of openings in contact with the conducting material, and is filled in the plurality of openings;
wherein the electricity conducting adhesive comprises a plurality of micron-sized electricity conducting particles and a plurality of nano-sized electricity conducting particles, and when the electricity conducting adhesive is melted, a size of the plurality of nano-sized electricity conducting particles maintain in nano-scale, and the plurality of micron-sized electricity conducting particles are not melted together with the plurality of nano-sized electricity conducting particles.

2. The conducting thin film of claim 1, wherein the conducting net comprises a plurality of nodes formed by lapping the conducting material, and the plurality of nodes are exposed to the plurality of openings of the protecting layer and are contacted with the electricity conducting adhesive.

3. The conducting thin film of claim 1, wherein the protecting layer is a network structure, and the plurality of openings are arranged in an array.

4. The conducting thin film of claim 1, wherein a diameter of each of the plurality of openings of the protecting layer is in a range from 1 μm to 100 μm.

5. The conducting thin film of claim 1, wherein the plurality of micron-sized electricity conducting particles and the plurality of nano-sized electricity conducting particles are different electricity conducting material.

6. The conducting thin film of claim 5, wherein the plurality of micron-sized electricity conducting particles are silver powders, and the plurality of conducting electricity conducting particles are selected from one or a combination of carbon nanotubes, carbon rods, and grapheme particles.

7. The conducting thin film of claim 5, wherein content of the plurality of nano-sized electricity conducting particles is in a range from 1 wt % to 20 wt % of total weight of the electricity conducting adhesive.

8. The conducting thin film of claim 5, wherein a particle size of each of the plurality of nano-sized electricity conducting particles is smaller than a diameter of each of the plurality of the openings of the protecting layer.

9. The conducting thin film of claim 5, wherein a particle size of each of the plurality of micron-sized electricity conducting particles is in a range from 10 μm to 200 μm, and a particle size of each of the plurality of nano-sized electricity conducting particles is in a range from 10 nm to 100 nm.

10. The conducting thin film of claim 1, wherein the conducting material comprises silver nanowires.

11. The conducting thin film of claim 1, wherein the conducting thin film further comprises an insulating layer, and the insulating layer is formed on the electricity conducting adhesive and covers the electricity conducting adhesive.

12. The conducting thin film of claim 1, wherein content of the plurality of nano-sized electricity conducting particles is in a range from 1 wt % to 20 wt % of total weight of the electricity conducting adhesive.

13. A method for preparing a conducting thin film, comprising:
providing a substrate;
arranging a conducting layer on the substrate, wherein the conducting layer comprises a conducting net formed of conducting material;
forming a protecting layer on the conducting layer, wherein the protecting layer defines a plurality of openings for exposing the conducting material; and
forming an electricity conducting adhesive on the protecting layer such that the electricity conducting adhesive passes through the plurality of openings in contact with the conducting material, and is be filled in the plurality of openings;
wherein the electricity conducting adhesive comprises a plurality of micron-sized electricity conducting particles and a plurality of nano-sized electricity conducting particles, and when the electricity conducting adhesive is melted, a size of the plurality of nano-sized electricity conducting particles maintain in nano-scale, and the plurality of micron-sized electricity conducting particles are not melted together with the plurality of nano-sized electricity conducting particles.

14. The method of claim 13, wherein the conducting net comprises a plurality of nodes formed by lapping the conducting material, and the plurality of nodes are exposed to the plurality of openings of the protecting layer and are contacted with the electricity conducting adhesive.

15. The method of claim 13, wherein the plurality of micron-sized electricity conducting particles are silver powders, and the plurality of nano-sized electricity conducting particles are selected from one or a combination of carbon nanotubes, carbon rods, and grapheme particles.

16. The method of claim 15, wherein a particle size of each of the plurality of nano-sized electricity conducting particles is smaller than a diameter of each of the plurality of the openings of the protecting layer.

17. The method of claim 13, wherein after performing the operation of forming the electricity conducting adhesive on the protecting layer, the method further comprises: curing the electricity conducting adhesive at a preset temperature for a preset time period.

18. The method of claim 17, wherein the preset temperature is in a range from 80° C. to 150° C., and the preset time period is in a range from 0.5 hour to 2 hours.

19. The method of claim 13, wherein content of the plurality of nano-sized electricity conducting particles is in a range from 1 wt % to 20 wt % of total weight of the electricity conducting adhesive.

20. A touch panel, comprising a conducting thin film, wherein the conducting thin film comprises:
a substrate;
a conducting layer arranged on the substrate, wherein the conducting layer comprises a conducting net formed of conducting material;
a protecting layer arranged on the conducting layer, wherein the protecting layer defines a plurality of openings for exposing the conducting material; and
an electricity conducting adhesive formed on the protecting layer such that the electricity conducting adhesive passes through the plurality of openings in contact with the conducting material, and is be filled in the plurality of openings;
wherein the electricity conducting adhesive comprises a plurality of micron-sized electricity conducting particles and a plurality of nano-sized electricity conducting particles, and when the electricity conducting adhesive is melted, a size of the plurality of nano-sized electricity conducting particles maintain in nano-scale, and the plurality of micron-sized electricity conducting particles are not melted together with the plurality of nano-sized electricity conducting particles.

* * * * *